United States Patent [19]

Wallentowitz et al.

[11] 4,423,883
[45] Jan. 3, 1984

[54] STEERING ARRANGEMENT FOR MOTOR VEHICLES

[75] Inventors: Henning Wallentowitz, Schanbach; Helmut Struck, Winnenden; Karl-Heinz Richter, Kernen, all of Fed. Rep. of Germany

[73] Assignee: Daimler-Benz Aktiengesellschaft, Stuttgart, Fed. Rep. of Germany

[21] Appl. No.: 218,970

[22] Filed: Dec. 22, 1980

[30] Foreign Application Priority Data

Dec. 22, 1979 [DE] Fed. Rep. of Germany ....... 2952087

[51] Int. Cl.³ .............................................. B62D 7/08
[52] U.S. Cl. ................................................... 280/96
[58] Field of Search ................... 280/96, 771, 95 R, 93

[56] References Cited

U.S. PATENT DOCUMENTS

| 2,731,277 | 1/1956 | Pearne | 280/96 |
|---|---|---|---|
| 2,824,749 | 2/1958 | Yasuda | 280/96 |
| 3,572,459 | 3/1971 | Nieminski | 280/96 |
| 3,617,071 | 11/1971 | Ivancic | 280/96 |
| 3,833,078 | 9/1974 | Channey | 280/96 |

*Primary Examiner*—Robert R. Song
*Attorney, Agent, or Firm*—Craig & Burns

[57] ABSTRACT

A steering arrangement for motor vehicles wherein two steerable wheels are coupled with a steering gear arm which is connected to a steering column. The steering gear arm is divided into at least two parts with one part of the steering gear arm being associated with each steerable wheel. At least one sun gear is mounted to the steering column which mates with planetary gears of a pair of planetary gear carriers. The planetary gear of each planetary carrier mates with an outside gear which forms a secondary drive for a part of the steering gear segment arm. A locking device is provided in order to enable an alternative locking of the planetary gear and the outside gear.

15 Claims, 6 Drawing Figures

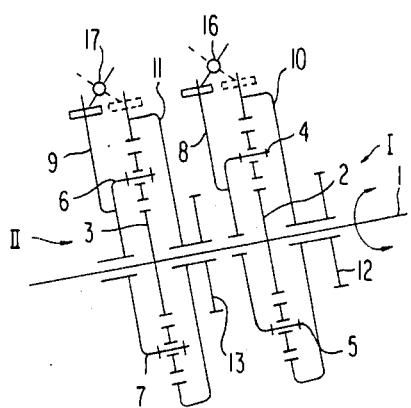
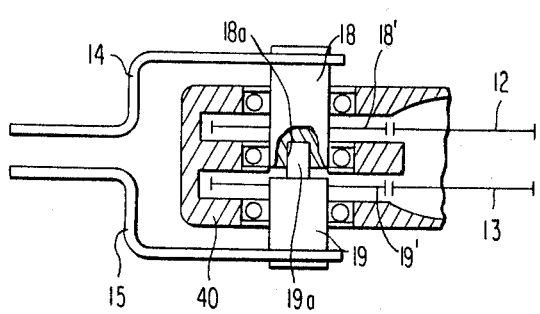
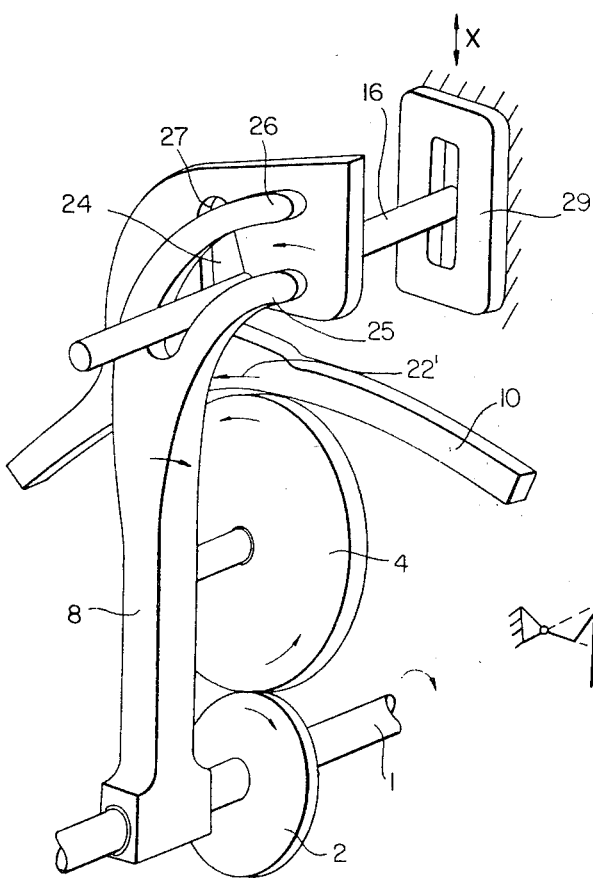
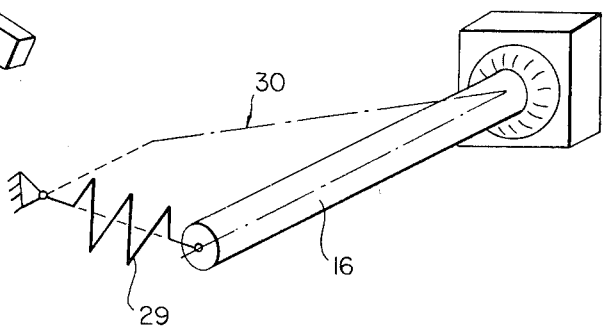

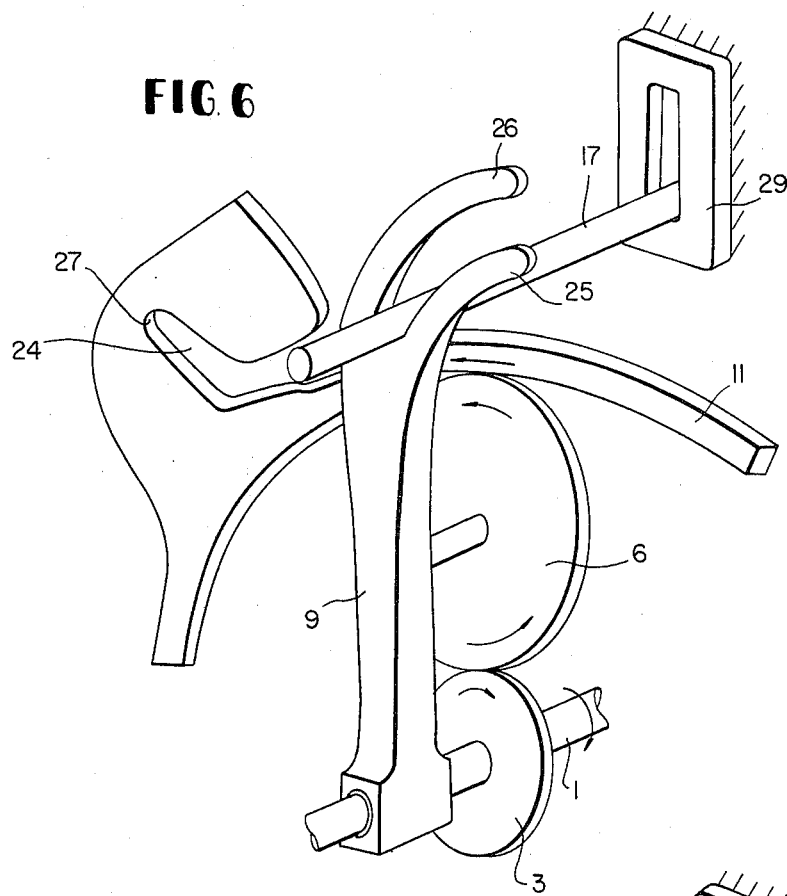
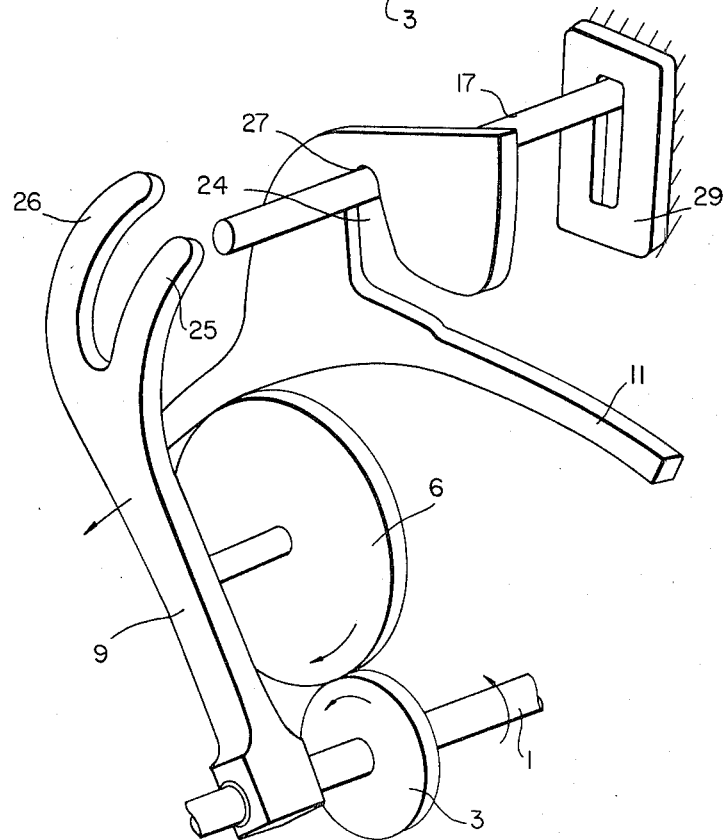

STEERING ARRANGEMENT FOR MOTOR VEHICLES

The present invention relates to a steering arrangement, and more particularly, to a steering arrangement for motor vehicles wherein two steerable wheels are, by way of steering rods, coupled with a steering gear arm connected with a steering column.

A steering arrangement of the aforementioned type has been proposed wherein a steering gear, by way of a steering gear arm, simultaneously causes a wheel turning of the right and left front wheel. The goal of these proposed steering systems is to enable the vehicle to meet all the requirements of fast straight driving as well as the negotiating of curves or turns while nevertheless enabling a turning circle which is as small as possible. Sometimes, mutually interfering factors will occur which, for example, result in requiring large turning circles or in a so-called uncontrolled or unintended engagement of the steering system without any action on the part of the driver of a motor vehicle.

The aim underlying the present invention essentially resides in providing a steering system which maintains all of the advantages of a steering system in a normal driving situation and yet permits a very small turning circle.

In accordance with advantageous features of the present invention, a steering gear arm is divided such that one part of the steering gear arm is operatively connected to the respective steerable wheels, with at least one sun wheel, disposed at the steering column, being adapted to engage or mate with planetary gears of a planetary gear carrier. The planetary gear of each planetary gear carrier is engageable with an outside gear wheel which forms a drive for one part of the steering gear arm. A locking device enables, on the one hand, alternative locking of the planet gear carrier and, on the other hand, a locking of the outside gear of the associated planetary gear.

An advantage of the divided steering gear arm of the present invention resides in the fact that the two parts of the steering gear arm, in a normal driving operation, are moved simultaneously and by the same turning angles. Therefore, the construction of the present invention enables a carrying out of all of the normal requirements for a fast straight driving of the motor vehicle. However, with an extensive turning of the steerable wheels, a separate steering of the two parts of the steering gear arms takes place since, when a predetermined maximum turning of the steerable wheel on the inside of a curve or turn is reached, a stop becomes operative and, by way of a locking device, stops or arrests the respective part of the steering gear arm in that position and releases the associated planetary gear carrier. However, the steerable wheel on the outside of the curve or turn may then, through a turning of the steering column, be turned more because the planetary gear carrier associated with the outside steerable wheel remains locked and thus only transmits the turning of the steering column to the steering gear arm part of the wheel on the outside of the curve or turn. The maximum turning angle of the steerable wheel on the outside of the curve can thus be adjusted in such a manner that it is possible to minimize the turning circle for the motor vehicle.

In accordance with the present invention, the conventional steering gear is replaced by two planetary gear carriers with one or more associated sun wheels for dividing the turning motion transmitted by the steering wheel through the steering column and, depending upon the turning direction, limits the turning angle of one or the other steerable wheels such as, for example, the front wheels of a motor vehicle.

In accordance with the present invention, the locking device includes a locking element which, in a first position, arrests an associated planetary gear carrier for carrying out a turning movement of the affected wheel and, in a second position, stops or arrests the associated outside gear at a time of release of the planetary gear carrier.

Advantageously, the outside gear wheel and/or the planetary gear carrier is, in accordance with the present invention, provided with a slide means for controlling the locking element.

In accordance with still further features of the present invention, the locking element of the locking device is formed as a bar supported on one side and having a free end at which a spring is mounted.

Preferably, at least one locking device is provided for each planetary gear unit and associated outside gear wheel.

According to the present invention, one unit is provided in one of the two locking positions for a control of the locking element of the locking means.

Advantageously, the parts of the steering gear are, in each case, in accordance with the present invention, mounted on a shaft with a steering gear arm. Moreover, each of the planetary gear carriers is provided with several planetary gears.

Preferably, two sun gears are mounted at the steering column, with the planetary gears of one of the two planetary gear carriers being associated with the two sun gears.

Preferably, in accordance with the present invention, the locking element of the locking device may be alternatively adjusted into two positions so that, in a first position, the planetary gear carrier associated with the locking element may be arrested and an oblique or turning motion of the associate wheel can be carried out while, in a second locking position of a locking element, the outside gear wheel may be stopped or arrested when the associated planetary gear carrier is released and thus the gear wheel is stopped in the respective final position.

Accordingly, it is an object of the present invention to provide a steering arrangement for motor vehicles which avoids, by simple means, shortcomings and disadvantages encountered in the prior art.

Another object of the present invention resides in providing a steering arrangement for motor vehicles which minimizes the distance required for executing a complete turning circle.

Yet another object of the present invention resides in providing a steering arrangement for motor vehicles which is simple in construction and therefore relatively inexpensive to manufacture.

A further object of the present invention resides in providing a steering arrangement for motor vehicles which functions reliably under all operating conditions.

A still further object of the present invention resides in providing a steering arrangement for motor vehicles which accurately limits the turning angle of the steerable wheels.

Another object of the present invention resides in providing a steering arrangement for motor vehicles wherein a maximum turning angle of the steering arrangement can be readily adjusted.

These and other objects, features, and advantages of the present invention will become more apparent from the following description when taken in connection with the accompanying drawings which show, for the purposes of illustration only, one embodiment in accordance with the present invention, and wherein:

FIG. 1 is a schematic illustration of a steering system in accordance with the present invention;

FIG. 2 is a partial cross sectional view of the parts of the steering gear arm in accordance with the present invention;

FIG. 3 is a perspective view of a locking device for the steering system of the present invention; and FIG. 4 is a schematic representation illustrating two possible positions of a locking element of the locking device of the present invention.

FIG. 5 is a perspective view of a locking device engaged with a segmented outside gear;

FIG. 6 is a perspective view of a locking device disengaged from a segmented gear.

Referring now to the drawings wherein like reference numerals are used throughout the various views to designate like parts and, more particularly, to FIG. 1, according to this figure, a divided steering system includes a steering column 1 which tranmits a turning motion of a steering wheel (not shown) to two sun gears 2, 3, with each sun wheel 2, 3 being adapted to mate with planetary gear or wheels 4, 5 and 6, 7, respectively. The planetary gears 4, 5 and 6, 7 are respectively located on planet gear carriers 8, 9 and mate with an associated outside gear wheel 10, 11. Each outside gear wheel 10, 11, which may have the shape of half of a hollow gear segment, is rigidly fastened to a secondary gear drive means 12, 13 for driving steering gear parts 14, 15 (FIG. 2) of a steering gear arm arrangement.

A turning motion, indicated by the double arrows in FIG. 1, is transmitted to the two steering gear units generally designated by the reference numerals I, II through the steering column 1, with each steering gear unit including the sun gears 2, 3, the planetary gear carriers 8, 9, associated planetary gears 4, 5 and 6, 7 as well as the outside gear segments 10, 11. Thus, two steerable wheels, especially the front wheels of a motor vehicle, are each brought into a desired turned or oblique position by one gear unit I, or II. Thus, the turning motion of the steering column 1 is divided on the two steering gear units I, II respectively formed by sun gear 2, planetary gears 4, 5, outside gear wheel 10, and sun gear 3, planetary gears 6, 7 and outside gear wheel 11. Each steering gear unit I, II of the steering system of the present invention includes a locking device 16, 17 with the locking device 16 being associated with the first gear unit I and the locking device 17 being associated with the second gear unit II.

As shown in FIG. 2, a bearing 40 is provided for supporting the steering-gear arm parts 14, 15, with a steering-gear arm shaft carrying the steering-gear arm parts 14, 15. The steering-gear arm shaft is divided into shaft sections 18, 19, with the shaft section 18 supporting the steering gear arm part 14 and the shaft section 19 supporting the steering gear arm part 15 so that they cannot turn. Ball bearings are provided for supporting the shaft sections 18, 19 and thereby the steering gear arm parts 14, 15. The shaft section 19 includes a cylindrical projection 19a engageable in a corresponding cylindrical recess 18a of the shaft section 18. The shaft projection 19a enables the two shaft sections 18, 19 to be rotatable relative to each other and, at the same time, defines the axial spacing of the respective shaft sections 18, 19. The shaft sections 18, 19 of the steering gear arm parts are each rigidly connected to one of the secondary drive gear means 12, 13 and cause an adjustment of the steering gear arm parts 14, 15 of the steering gear arm as a function of an executed turn of the secondary drive gear means 12, 13. Gear wheels 18', 19' respectively provided on the shaft sections 18, 19 engage with an associated secondary drive gear means 12 or 13. The divided steering system of FIGS. 1 and 2 operate in the following manner:

In a normal driving operation, the planetary gear carrier of the gear unit I, which includes the sun gear 2, planetary gears 4, 5, and outside gear wheel segment 10, is locked by the locking device 16 so that a turn of the steering wheel 1, transmitted through the sun gear 2 and the planetary gears 4, 5 is transmitted to the outside gear wheel segment 10. In the gear unit II, which includes the sun gear 3, planetary gears 6, 7 and planetary gear carrier 9, an operation analogous to the gear unit I takes place. The operation of the gear units I, II results in a movement of the two steering gear arm parts 14, 15 of the steering gear arm by the same angle of turning as a function of the turn of the steering wheel of the motor vehicle.

The maximum turning angle of the steerable wheels in both directions is defined in such a manner that the front wheel, which at the time of the turn or curve is located to an outside of the curve or turn, executes the smallest possible turning circle. If the steering column 1 is turned to the point whereat the front wheel in the inside of the curve, for example, the front wheel associated with the secondary gear drive means 12, that is, the gear unit I, reaches a maximum turning angle the gear unit I, reaches maximum turning angle, the locking device 16 becomes operative. The locking device 16, associated with the gear unit I, is moved into a position illustrated in phantom lines, so as to release the planetary gear carrier 8 and stop or arrest the movement of the outside gear wheel segment 10. At the other front wheel, i.e., the wheel on the outside of the curve or turn which is operated by the gear unit II, the planetary gear carrier 9 is stopped or arrested as shown by the solid line position of the locking device 17 in FIG. 1. Turning the steering wheel further through the steering column and locked planetary gear carrier 9, the outside wheel is turned so far to an inside stop that a desired minimum turning circle is reached. In case of a turning of the front wheels in opposite directions, when the maximum turning or outside stop of the wheel is then on the inside of the curve or turn is reached, the planetary gear carrier 9 is released and the outside gear wheel 11 is stopped or arrested while the planetary gear carrier 8 continues to remain stopped so that when the secondary gear drive means is stopped, the secondary gear drive means 12 can be moved for the associated part of the steering gear arm until the inside stop or something similar is reached which defines the minimum turning circle.

A possible way, the stopping device is working, is demonstrated by FIG. 5 and FIG. 6.

FIG. 5 is showing one situation with an arrested planetary gear carrier and a free outside gear wheel. Turnings of the steering wheel are transformed to movements of the front wheel. This is the operational mode, when both front wheels are turned.

In FIG. 6 the outside gear wheel is arrested and the planetary gear carrier is free. Turnings of the steering wheel do not affect turnings of the front wheel connected with this gear unit.

The operational mode is changed automatically by driving the locking bar out of the planetary gear carrier slot into the outside gear wheel slot. FIG. 3 is demonstrating this changing. The locking bar is just sliding in both slots.

FIG. 3 provides an example of a locking device 16, 17 for the steerin system of the present invention. As shown in FIG. 3, a sun gear 2 which, for example, may correspond to the sun gear 2 in FIG. 1, is disposed on the steering column 1 so as to be rotatable therewith. The sun gear 2 is adapted to mate with a planetary gear wheel 4 which, for example, may correspond to the planetary gear wheel 4 of FIG. 1. The planetary gear wheel 4 mates with an outside gear wheel segment 10 which, for example, may correspond to the outside gear wheel segment 10 of FIG. 1 and has the respective required shape in order to either form the secondary gear drive means for the associated part of the steering gear arm or to be indirectly connected to a part of the steering gear arm.

As shown in FIG. 3, a planetary gear carrier 8, corresponding to, for example, the planetary gear carrier 8 in FIG. 1, may take the form of a lever which includes sliding surfaces 25, 26 formed with a curved slot 24. The outside gear wheel 22 includes a slot or recess 27 which at least partially extends vertically with respect to the slot 24. The slots 24, 27 are adapted to receive a locking bar 16 which forms the locking element which, on one side, is disposed in a bearing unit 29 so as to enable the bar to move in a direction indicated by the double arrow x. A further bearing unit (not shown) is provided for the opposite end of the locking bar 16. The direction of the slots 24, 27 are constructed, as a function of the turning direction, in such a manner that the locking bar 16, for example, because of its own weight, in a normal driving operation, causes a locking of a swinging of the lever 8 and prevents movement around the axis defined by the steering column 1, whereas, at the same time, a movement of the outside gear wheel for the secondary drive of the associated part of the steering gear arm is possible. This movement of the outside wheel takes place in a direction of the arrow 22' when the lever 8 forming a planetary gear carrier is stopped or arrested.

When the front wheel, for example, the front wheel that is on the inside of the curve, reaches a maximum turning, the locking bar 16 must release the lever 8. The release takes place because of the fact that the outside gear wheel segment 10 is prevented from moving in the direction 22' because the associated wheel is run against the outside stop (not shown). When the steering wheel and the steering column 1 are turned further, the locking bar 16 therefore runs up against the guide surfaces 25 of the lever 8 and is, with respect to the steering column 1, pressed radially to the outside. The locking bar 16 thus reaches the area of the slot 27 and now locks the outside wheel 10. On the other hand, the lever 8 is free from movement in a counterclockwise direction. Therefore, the steerable wheel that is disposed on the outside of the curve may be turned further by means of a turning of the steering column 1 with a turning direction of the planetary gear 4 being illustrated by the arrows in FIG. 3.

In the embodiment described hereinabove, the locking bar 16 that forms the locking element is, due to its weight and corresponding contour of the sliding surfaces 25, 26, at both sides of the slots 24, 27 held in two possible locking positions. In lieu of providing bearing units 29 at both sides of the locking bar 16, it is also possible in accordance with the present invention to, as shown in FIG. 4, support one side of the locking bar 16 in a bearing unit with a free end of the locking bar having a spring 29 connected thereto and to a stationary fixed part. The locking bar 16 assumes the position illustrated in full line in FIG. 4 when the locking bar 16 stops the movement of the lever 8 while the locking position of the locking bar 16 when the lever 8 is released and the outer wheel 10 is blocked or stopped being indicated by the phantom line generally designated by the reference numeral 30.

The one sides bearing support of the locking bar 28 is sufficient since, at the time of switching, when the wheel on the inside of the curve runs against an outside stop, from one locking position to the other, the locking bar 16 travels through a dead center position.

The function of the locking devices 16, 17 which, may be constructed as shown in FIG. 4, resides in locking the associated planetary gear carrier when the turning of the steering wheel causes a corresponding turning of the associated front steerable wheels into a turned position, or the planetary gear is released by the bar 16 and the bar locks the outside gear wheel setment 10 when, during a further turning of the steering wheel, the affected front wheel is not to be moved. In the latter situation, the planetary gear wheel rides on the outside gear wheel.

As can readily be appreciated, the steering system of FIGS. 1–4 may also be constructed so as to utilize a single sun gear instead of two gears with the planetary gears of the two planetary sets or planetary carriers 8, 9, rotating on the single sun gear.

While the construction of FIGS. 1 and 3 provide an illustration wherein the planetary gear carrier 4 and 9 or 23 only have one planetary gear each, designated by the reference numerals 4, 5, 6, 7 and 21, it is also possible, as a function of a shape or contour of the outside gear wheel segments 10 and 11 to provide more than one planetary gear.

Additionally, instead of a locking device such as illustrated in FIGS. 3 and 4, it is also possible to utilize other constructions for achieving the desired locking.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A steering arrangement for motor vehicles which includes a steering column means for transmitting turning motions to two steerable wheels, steering rod means connected to the two steerable wheels and to a steering gear arm means, characterized in that the steering gear arm means is divided into two parts with each part being respectively connected to one of the steerable wheels, a drive means is provided for driving the steering gear arm means, a planetary gear means is interposed between the secondary drive means and the steering column means, and in that a locking means is provided for alternatively locking a portion of the planetary gear means and a portion of the drive means.

2. A steering arrangement according to claim 1, characterized in that the planetary gear means includes at least one sun gear means and at least one planetary gear means associated with each steerable wheel, a planetary gear carrier means associated with each part of the steering gear arm means is provided for carrying the respective planetary gear means, the respective sun gear means are mounted on the steering column means are and adapted to mesh with the respective planetary gear means, and in that the drive means includes at least one outside gear means for each steerable wheel adapted to mesh with the planetary gear means of the respective steerable wheel.

3. A steering arrangement according to claim 2, characterized in that the locking means is adapted to alternatively lock the planetary gear carrier means and the outside gear means of the respective steerable wheels.

4. A steering arrangement according to claim 3, characterized in that a stop means is provided for each of the steerable wheels for releasing the locking means and limiting a maximum turning of the steerable wheels.

5. A steering arrangement according to claim 3, characterized in that the locking means including a locking element displaceable between a first and second position, and in that said locking element locks the associated planetary gear carrier means in the first position for enabling a turning movement of the steerable wheel associated therewith and, in the second position, locks the associated outside gear means at a time of release of the planetary gear carrier means.

6. A steering arrangement according to claim 5, characterized in that means are provided on at least one of the outside gear segment means and planetary gear carrier means for controlling a position of the locking element.

7. A steering arrangement according to claim 6, characterized in that said control means includes cooperable guide surfaces provided on the planetary gear carrier means and the outside gear means.

8. A steering arrangement according to claim 7, characterized in that the guide surfaces are formed by slots provided in the planetary gear carrier means and the outside gear segment means.

9. A steering arrangement according to one of claims 5, 6, 7, or 8, characterized in that the locking element is formed as a bar, means are provided for supporting one end of the bar, and in that spring means are interposed between a free end of the bar and a fixed member.

10. A steering arrangement according to claim 9, characterized in that one locking means is provided for each planetary gear carrier means and the outside gear means.

11. A steering arrangement according to one of claims 5, 6, 7, or 8, characterized in that means are provided for controlling the locking element of the locking means in one of the first and the second positions.

12. A steering arrangement according to one of claims 1, 2, 3, 5, or 6, characterized in that the steering gear arm means includes a steering gear arm shaft means for mounting each of the parts of the steering gear arm means.

13. A steering arrangement according to claim 12, characterized in that the steering gear arm shaft means is of a bypartite construction with sections of the shaft means being mounted so as to be rotatable relative to one another.

14. A steering arrangement according to one of claims 2, 3, 4, or 5, characterized in that a plurality of planetary gear means are carried by each planetary gear carrier means.

15. A steering arrangement according to claim 14, characterized in that at least two sun gears are mounted at the steering column means, and in that said two sun gear means are adapted to mesh with the planetary gear means on one of the planetary gear carrier means.

* * * * *